Dec. 20, 1955 M. S. SKLAR 2,727,489
AQUARIUM FISH FEEDING STATION
Filed May 24, 1954

Melvin S. Sklar
INVENTOR

BY *Crnow Co.*
ATTORNEYS.

United States Patent Office 2,727,489
Patented Dec. 20, 1955

2,727,489

AQUARIUM FISH FEEDING STATION

Melvin S. Sklar, East Rockaway, N. Y.

Application May 24, 1954, Serial No. 431,629

3 Claims. (Cl. 119—5)

This invention relates to an aquarium fish feeding station.

It is an object of this invention to provide a fish feeding device of the kind to be more specifically described hereinafter for containing fish food in an aquarium within easy reach of the feeding fish.

It is another object of this invention to provide a fish feeding device of this kind for containing fish food submerged in an aquarium in such a manner that the device and food contained therein may quickly and easily be inserted into and removed from the aquarium thereby providing for the desired feeding of the fish without the food becoming lodged out of the reach of the fish to result in the contamination of the aquarium when the food otherwise may be so located.

Other and further objects and advantages of the invention will be hereinafter described and the novel features thereof defined in the appended claims.

Figure 1:
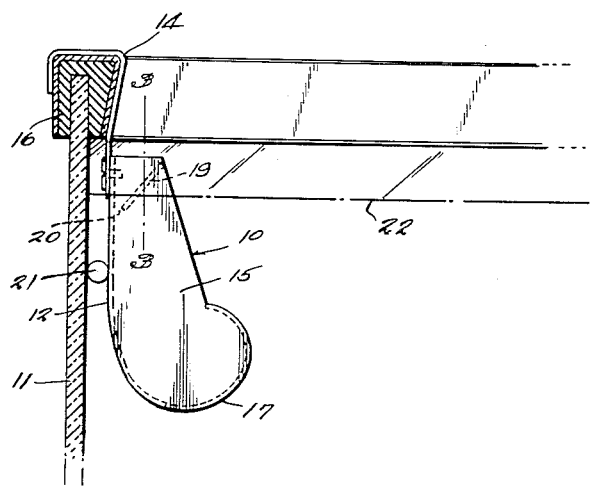
Fig. 1 is a side elevation of a fish feeding device constructed according to my invention in an aquarium, the aquarium being partly broken away and partly in section.

The fish feeding station or device 10 of my invention is adapted to be placed into an aquarium for fish as in a home or the like. The aquarium 11 is preferably made of glass and the fish feeding station is adapted to be hooked onto an edge of the glass in such a manner that the fish food may be easily and readily placed within the station within access of the fish or fishes in the aquarium. The aquarium 11 may be kept in a substantially clean condition by this station as the fish food will always be within the station from the time it is placed therein and in the aquarium until the time that the station is removed. The station will be removed from the aquarium when it is desired to clean the aquarium.

Referring more specifically to the drawings the numeral 12 designates generally the flat rear wall of the fish feeding station which is adapted to be inserted within the aquarium. The rear wall 12 has vertically extending hooks 14 on the rear surface thereof for hooking engagement over the upper longitudinal edges of the aquarium.

The fish feeding station 10 includes a pair of horizontally spaced apart end walls 15 which are secured to the rear wall 12 and the end walls 15 are substantially J shaped although this particular shape of the end walls 15 is principally a matter of choice of the design of the fish feeding station 10.

A resilient buffer 16 is engaged about the upper edge of the aquarium 11 to provide a suitable support for the hooks 14 on the upper edge of the aquarium.

Figure 4:
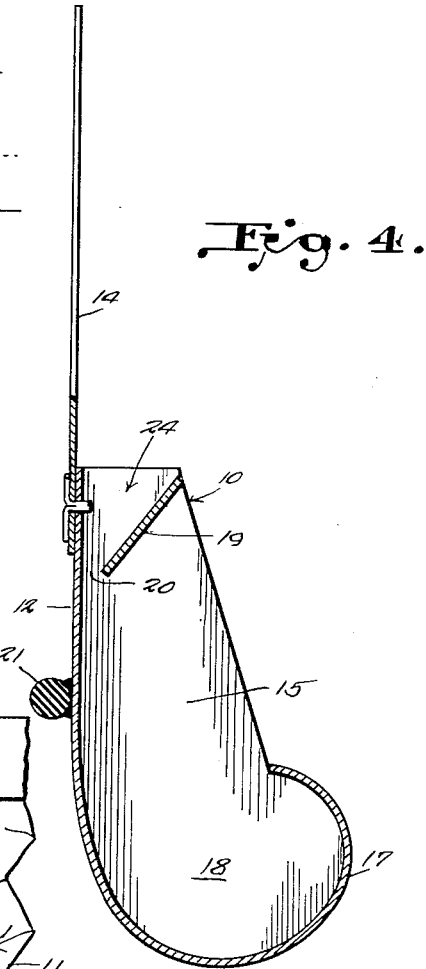
Fig. 4 is an enlarged side elevation in mid-section, of the feeding station of Fig. 1.
Figure 2:
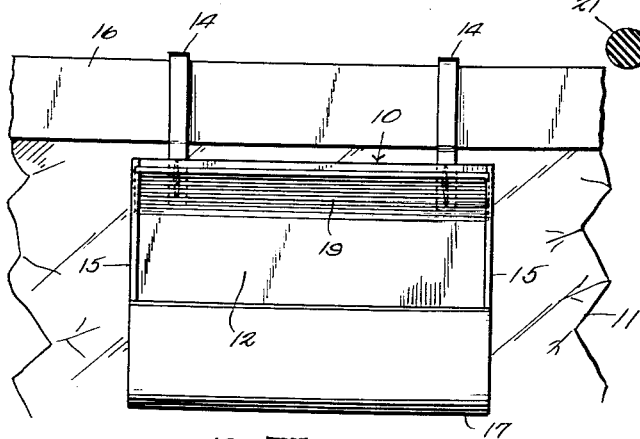
Fig. 2 is a front elevation of the feeding device in an aquarium, the aquarium being partly broken away.
Figure 3:
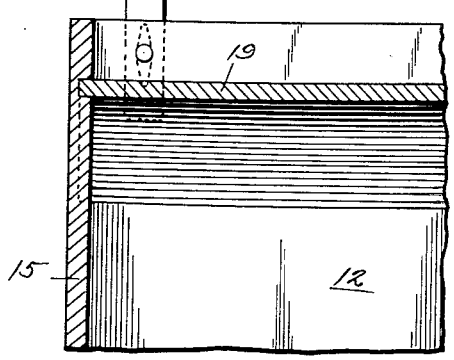
Fig. 3 is an enlarged fragmentary detailed section of a corner of the device taken substantially on the line 3—3 of Fig. 1.

There is provided a curved bottom wall 17 which is the lower extension of the rear wall 12, the bottom wall 17 being substantially concaved in configuration to suit the lower ends of the end walls 15 of the station. The edge of the bottom wall 17 remote from the rear wall 12 is curved upwardly from the lower edge of the rear wall and substantially reverted as clearly shown in Fig. 4 of the drawings. This formation of the bottom wall 17 between the end walls 15 defines a fish food receptacle 18 for the purposes to be more particularly brought out hereinafter.

The flat baffle 19 is engaged at its opposite ends with each of the end walls 15 being spaced outwardly from the rear wall 12 having a slot 20 between the lower edge of the baffle 19 and the rear wall 12. The baffle 19 is inclined upwardly and outwardly from the rear wall to define a hopper 24.

There is provided a resilient bar or projection 21 on the rear side of wall 12, the bar 21 being engageable with a vertical wall of the aquarium to assure correct suspension of the fish feeding station in the aquarium. The bar 21 is disposed horizontally on the mid-back of the rear wall 12. The aquarium is normally filled to water line 22. The hooks 14 on feeding station 10 when placed on buffer 16, suspend the station to a point where baffle 19 extends above and below water line 22. The fish food is easily placed within the hopper and will drop through the slot 20 into the fish food receptacle 18, where it is readily accessible to the fish.

By providing a curved bottom wall for the receptacle 18 there is no chance of the fish food being lodged within a corner inaccessible to the fishes and difficult to clean.

This aquarium fish feeding station provides an orderly and effective means for feeding the aquarium fish. It also avoids the food lodging in inaccessible spots, decaying, and contaminating the water.

While the specific details of one embodiment of this invention have been herein shown and described, the invention is not confined thereto as changes and alterations may be made without departing from the spirit and scope thereof as defined in the appended claims.

I claim:

1. A fish feeding device comprising a vertical, upstanding rear wall merging into a curved bottom, extending outwardly, upwardly and inwardly towards the rear wall, two upstanding end walls each with an edge joining a lateral edge of the rear wall and curve bottom to form a food receptacle, with open front above the inturned edge of the bottom, the upper ends of the end walls supporting a horizontally disposed baffle spaced from the rear wall to define a slot and extending upwardly and outwardly to form a feed hopper, and attaching means fixed to the device to support it in and along one side of an aquarium with hopper extending above the normal water line.

2. The device of claim 1, in which the means are hooks extending upwardly and rearwardly from the rear wall to fit over the top edge of the aquarium.

3. The device of claim 1, which comprises also a projection on the back of the rear wall to keep a space between it and the adjacent wall of the aquarium.

References Cited in the file of this patent

UNITED STATES PATENTS

| | | |
|---|---|---|
| 1,976,962 | Pape | Oct. 16, 1934 |
| 2,656,819 | Meier | Oct. 27, 1953 |